(12) United States Patent
Verrat-Debailleul

(10) Patent No.: US 9,291,325 B2
(45) Date of Patent: Mar. 22, 2016

(54) ILLUMINATING GLAZING UNIT FOR A VEHICLE

(71) Applicant: SAINT-GOBAIN GLASS FRANCE, Courbevoie (FR)

(72) Inventor: Adele Verrat-Debailleul, Villers-sur-coudun (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/374,713

(22) PCT Filed: Jan. 21, 2013

(86) PCT No.: PCT/FR2013/050124
§ 371 (c)(1),
(2) Date: Jul. 25, 2014

(87) PCT Pub. No.: WO2013/110885
PCT Pub. Date: Aug. 1, 2013

(65) Prior Publication Data
US 2015/0016132 A1    Jan. 15, 2015

(30) Foreign Application Priority Data

Jan. 26, 2012 (FR) .................................... 12 50740

(51) Int. Cl.
*F21S 8/10* (2006.01)
*B60Q 3/02* (2006.01)
(Continued)

(52) U.S. Cl.
CPC .......... *F21S 48/22* (2013.01); *B32B 17/10036* (2013.01); *B32B 17/1077* (2013.01); *B32B 17/10541* (2013.01); *B32B 17/10761* (2013.01); *B32B 17/10788* (2013.01); *B60Q 1/268* (2013.01); *B60Q 1/2611* (2013.01); *B60Q 3/0213* (2013.01); *G02B 6/0021* (2013.01); *G02B 6/0095* (2013.01); *G02B 6/0036* (2013.01); *G02B 6/0068* (2013.01)

(58) Field of Classification Search
USPC .................. 362/503, 511, 602, 605, 216, 545
See application file for complete search history.

(56) References Cited

U.S. PATENT DOCUMENTS 5,634,708 A * 6/1997 Koie ...................... B60Q 1/302
                                                     362/23.01
7,160,010 B1 * 1/2007 Chinniah .............. F21S 48/215
                                                     362/511

(Continued)

FOREIGN PATENT DOCUMENTS

DE          10320614         12/2004
DE         102004039883       6/2006
(Continued)

OTHER PUBLICATIONS

International Search Report issued for International Application No. PCT/FR2013/050124, dated May 17, 2013.

*Primary Examiner* — Laura Tso
(74) *Attorney, Agent, or Firm* — Pillsbury Winthrop Shaw Pittman LLP

(57) ABSTRACT

An illuminating glazing unit for vehicles includes a first transparent sheet with a first main face, a second main face, and a peripheral edge, a plurality of light-emitting diodes, each having an emitting face, and a light extraction element, which may be located on one of the main faces of the first sheet, wherein the first sheet is pierced with a through hole delimited by an internal edge, and wherein one or more of the light-emitting diodes are housed in the through hole, with their emitting faces turned toward the internal edge.

16 Claims, 1 Drawing Sheet

(51) Int. Cl.
*F21V 8/00* (2006.01)
*B60Q 1/26* (2006.01)
*B32B 17/10* (2006.01)

(56) References Cited

U.S. PATENT DOCUMENTS

| 2007/0217213 | A1* | 9/2007 | Chang | B60Q 1/268 362/503 |
| 2008/0055931 | A1* | 3/2008 | Verstraete | G02B 6/0096 362/612 |
| 2011/0007518 | A1* | 1/2011 | de Lamberterie | B60Q 1/2607 362/511 |
| 2014/0003072 | A1* | 1/2014 | Yamamoto | B60Q 1/268 362/503 |

FOREIGN PATENT DOCUMENTS

| FR | 2 955 530 | 7/2011 |
| WO | WO 2004/106056 | 12/2004 |
| WO | WO 2008/139353 | 11/2008 |

* cited by examiner

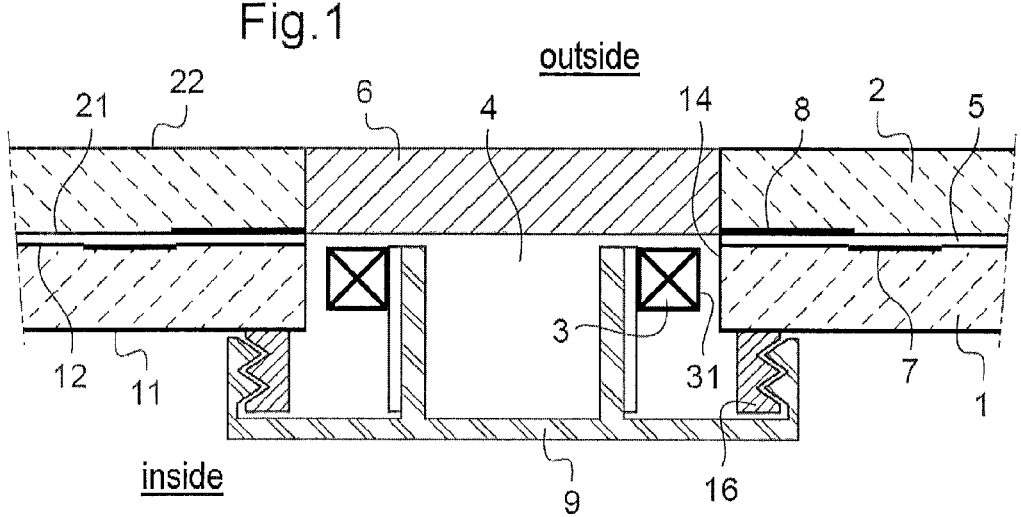
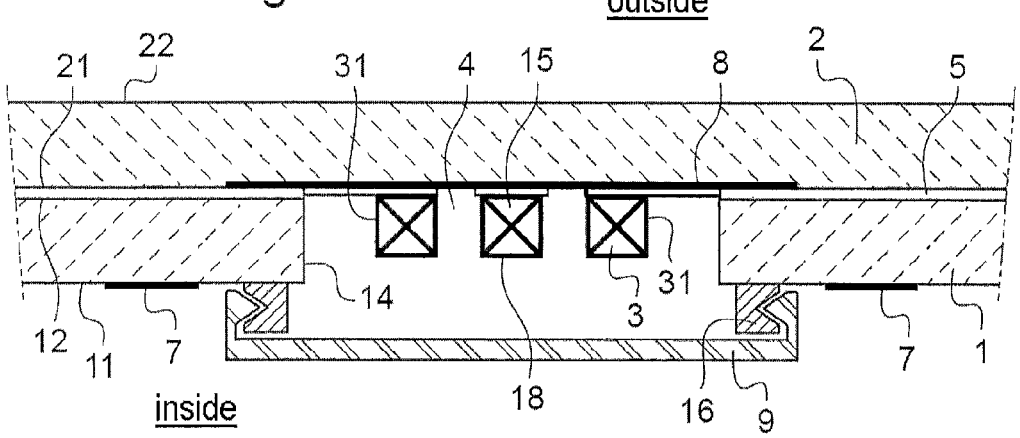
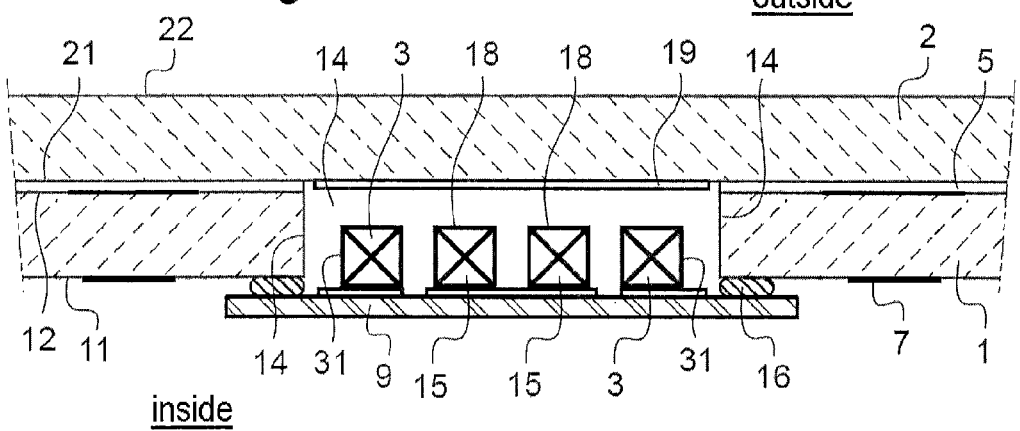

ILLUMINATING GLAZING UNIT FOR A VEHICLE

CROSS-REFERENCE TO RELATED APPLICATIONS

This application is the U.S. National Stage of PCT/FR2013/050124, filed Jan. 21, 2013, which in turn claims priority to French Application No. 1250740, filed Jan. 26, 2012. The contents of all of these applications are incorporated herein by reference in their entirety.

FIELD

The present invention relates to an illuminating glazing unit for vehicles, comprising light-emitting diodes housed in a hole pierced in at least one sheet of the glazing unit. It also relates to a vehicle having a glazing unit of this type.

BACKGROUND

There is a known way of incorporating light-emitting diode modules (LED modules) in the edges of single-layer or laminated glazing units, in such a way that the light emitted by the LEDs enters through the edge of a glass sheet and is guided by the sheet to a diffusing element, also known as a light extraction means.

These illuminating glazing units essentially have the function of ambient lighting or light signaling, using low-power LEDs for this purpose. The light output of these edge-illuminated glazing units is generally limited because of the losses of light due to light absorption by the glass acting as the waveguide and/or by the materials in the proximity thereof.

However, attempts to overcome this problem by using more powerful LEDs give rise to a problem of overheating. This is because it is often difficult to remove the heat generated by LED modules during their operation in a confined environment. In the field of motor vehicles or other fields, it is often necessary to protect the LED modules from the action of moisture which is always present. This protection is commonly provided either by encapsulation, that is to say by overmolding the LED modules with an organic polymer injected in liquid form and then hardened, or by housing the LED modules in a removable or non-removable way in more or less watertight casings. Prolonged overheating of LEDs almost inevitably leads to undesired shortening of their life.

SUMMARY

The present invention is based on an approach which is very different from that described above. Instead of attempting to use increasingly powerful LEDs, the proposal is to improve the overall light output of the glazing unit by shortening the optical path followed by the light between the LED and the extraction means that extracts the light from the waveguide (the glass sheet) and diffuses it toward the inside and/or the outside of the vehicle.

Instead of bringing the light extraction means closer to the peripheral edge of the sheet, the proposal is to create an additional edge in the proximity of the extraction means by piercing a through hole in the illuminated glass sheet. This hole must be large enough to receive one or more LEDs which inject light through the additional edge, this light then being extracted straight afterwards by the extraction means in the immediate proximity of the hole.

This technical solution makes it possible to reduce to only a few centimeters the optical path followed by the light before extraction. The light output and the illumination power of a glazing unit of this type are independent of the distance between the extraction means and the edge of the glazing unit. By creating one or more additional edges it is possible to increase the injection surface considerably and to multiply the number of light sources, regardless of whether these are low- or high-power sources.

The present invention therefore proposes an illuminating glazing unit for vehicles, comprising
a first transparent sheet of mineral glass with a first main face, a second main face, and a peripheral edge,
a plurality of light-emitting diodes (LEDs), each having an emitting face, and
a light extraction element, preferably located on one of the main faces of the first sheet,
characterized in that the first sheet is pierced with a through hole delimited by an internal edge, and in that one or more LEDs are housed in the through hole, with their emitting faces turned toward the internal edge.

Clearly, the present invention also includes illuminating glazing units which have a plurality of through holes containing LEDs. These holes may have various geometric shapes, which are mainly limited by the technical feasibility of the piercing method and by the strength of the pierced glass sheets. At the time when the invention was made, circular or rectangular shapes, preferably with rounded angles, gave the best results in terms of strength of the sheet and ease of piercing. However, other, more complex hole shapes, which may become technically simpler to produce in the future are, clearly, also included in the invention.

The through hole or holes are preferably sufficiently large to house a plurality of LEDs or a plurality of LED modules. However, they must not exceed a certain size beyond which the strength of the glazing unit may be significantly reduced. The area of each through hole is preferably not more than 100 $cm^2$, and is preferably in the range from 10 to 50 $cm^2$.

The glazing unit according to the invention is preferably a laminated glazing unit; that is to say, it preferably comprises, in addition to the first sheet, a second transparent sheet of mineral glass with a first main face, a second main face and a peripheral edge, and a lamination interlayer, also transparent, which is in adhesive contact with the two glass sheets, or more precisely with the second main face of the first sheet and the first main face of the second sheet.

In the present application, the term "first sheet" always signifies the sheet pierced and illuminated by the internal edge of the hole. The second sheet is generally not illuminated. The glazing unit according to the invention is preferably mounted on the vehicle in such a way that the first sheet is the one in contact with the passenger compartment of the vehicle and the second sheet is the one located nearer the outside of the vehicle, often in direct contact with the atmosphere outside the vehicle.

The term "first main surface" signifies, in relation to both the first and the second sheet, the face of the sheet turned toward the inside of the vehicle. Logically, the term "second main surface" signifies the surface of each sheet which faces, or is intended to face, toward the outside of the vehicle.

Preferably, a colorless soda-lime mineral glass, such as Planilux®, marketed by the present applicant, is used for the first sheet. The first sheet typically has a thickness in the range from 2.5 to 6 mm in the case of a single-sheet glazing unit, and a thickness in the range from 1.4 to 3.2 mm, preferably from 1.4 to 2.1 mm, in the case of a laminated glazing unit.

Clearly, the second sheet, like the first sheet, may also be colorless and transparent. In one embodiment, a laminated glazing unit according to the invention is formed of two colorless Planilux® sheets.

Unlike the first sheet, the second sheet is advantageously made of tinted glass, for example Vénus® TSA3+ or TSA4+ glass, also marketed by the present applicant. The second sheet typically has a thickness in the range from 1.4 to 2.1 mm.

The second sheet may be larger than the first, and may thus extend beyond the latter over at least a part of its periphery. This variant may be useful if the first sheet is illuminated not only via the through hole but also via its peripheral edge. The supplementary illumination system, operating through the peripheral edge and including LED modules, may then be applied onto the first face of the second sheet at a point where it extends beyond the first sheet.

The lamination interlayer used in laminated glazing units may be made of any transparent polymer material commonly used for this purpose, for example poly(vinyl butyral) (PVB), thermoplastic polyurethane (TPU) or ethylene vinyl acetate copolymer (EVA). It typically has a thickness in the range from 0.2 to 1.1 mm, and may be colorless or tinted.

In the case of a laminated glazing unit, the through hole may be limited to the first sheet, or may extend through the lamination interlayer and the second transparent sheet. In this case, the piercing is preferably carried out on the glazing unit after lamination.

If the hole extends through the whole thickness of the glazing unit, the through hole in the second sheet is advantageously filled with a blocking element. This blocking element essentially has the function of masking the LED modules located in the hole and providing a seal against liquid water and preferably also against water vapor, so as to protect the LED modules and the passenger compartment from external moisture.

It is possible to use any appropriate known type of material which is commonly used for this purpose, preferably an opaque polymer material which may or may not be elastomeric, and which may if necessary be fixed to the second sheet by means of a sealing joint. This element may be, notably, an encapsulation element formed by reaction injection molding (RIM).

The light extraction element is preferably located in the immediate proximity of the through hole. This is because the light output decreases markedly when the distance between the light source and the light diffusion means increases. The distance separating the internal edge of the hole from the light extraction element is preferably not more than 20 cm, particularly not more than 10 cm, and ideally not more than 5 cm. This distance is the distance between the internal edge and the point of the extraction means closest to this internal edge.

As mentioned above, the light extraction means is generally located on one of the main faces of the illuminated sheet. If the light is to be diffused toward the inside of the vehicle, the extraction means is preferably an opaque diffusing coating, preferably white in color, located on the second main face of the first sheet. In fact, this embodiment is more advantageous than a semi-opaque coating located on the first main face of the first sheet, which would diffuse only part of the light toward the inside of the vehicle, a non-negligible part being diffused toward the outside of the vehicle.

Conversely, if the light is to be diffused mainly toward the outside of the vehicle, for example in the case of a signal light, the opaque diffusing coating is advantageously located on the first main face of the illuminated sheet, that is to say on the inner face of this sheet.

The light extraction element may take the form of one or more diffusing areas arranged around the through hole. It is particularly advantageously made in the form of a pattern with central symmetry, the center of symmetry of this pattern being preferably superimposed on the center of symmetry of the through hole, or in the form of a pattern with axial symmetry, the axis of symmetry being preferably superimposed on an axis of symmetry of the through hole.

This superimposition of the centers of symmetry is not only very satisfactory in terms of appearance, but also contributes to the uniform luminosity of the light extraction means.

The power supply to the LEDs located in the through hole may be provided by an electrical lead integrated into the laminated glazing unit, for example an electrical wire incorporated into the lamination interlayer; alternatively, this electrical wire may be applied onto the first main face of the first sheet (on the passenger compartment side), and may be protected by a cover if necessary.

The through hole in the first sheet in which the LEDs are housed is advantageously closed by a cover, preferably a removable cover, fixed on the internal edge of the through hole, or on the first main face of the first sheet, by reversible fixing means.

This cover may be an opaque cover which essentially has the function of concealing the LED modules from the sight of the passengers in the vehicle.

However, the present applicant has also devised an embodiment shown in FIG. 2, in which the cover is translucent (diffusing) or transparent, and in which the through hole contains not only the LEDs that inject their light into the internal edge, but also LEDs whose emitting faces are turned toward the cover, instead of toward the internal edge.

This embodiment, combining direct lighting through the transparent or translucent cover with indirect lighting via the light extraction means, is characterized by a particularly advantageous light output.

The present applicant has also devised an embodiment, shown in FIG. 3, in which additional LEDs emit their light toward the outside of the vehicle, instead of toward the inside, through an enamel that is translucent, in other words diffusing and semitransparent, applied onto one of the main faces of the second sheet, preferably the first face of the second sheet.

The latter embodiment corresponds, for example, to the case of a signal light such as a flasher repeater, integrated into a vehicle window.

The present invention also proposes a vehicle having an illuminating glazing unit as described above. As explained above, in a vehicle of this type the first main face of the first sheet of the glazing unit is in contact with the inside of the vehicle.

The vehicle may be an aircraft, a boat, or any land vehicle. Preferably, the glazing units according to the present invention will be used in motor vehicles, particularly as part of the roof of a motor vehicle.

BRIEF DESCRIPTION OF THE DRAWINGS

The present invention will now be described more fully, with reference to the attached drawings, in which:

FIG. 1 shows a first embodiment of an illuminating glazing unit according to the invention, FIG. 2 shows a second embodiment which differs from that of FIG. 1 in that it further comprises LEDs for the direct lighting of the passenger compartment, and FIG. 3 shows a third embodiment in which LEDs of the direct illumination type diffuse their light toward the outside of the vehicle.

DETAILED DESCRIPTION

The illuminating glazing unit shown in FIG. 1 is a laminated glazing unit having a first sheet 1 with a first main face 11 oriented toward the inside of the vehicle, a second main face 12 oriented toward the outside of the vehicle and a peripheral edge (not shown). This first glass sheet is bonded via a lamination interlayer 5 to a second glass sheet 2 having a first main face 21, a second main face 22 and a peripheral edge (not shown).

A through hole 4 has been pierced through the second sheet 2, the lamination interlayer 5 and the first sheet 1, thus creating an internal edge 14 in the latter. The through hole in the second sheet is blocked by an opaque blocking element 6 flush with the level of the second surface 22 of the second sheet.

LEDs 3 are housed in the through hole 4 of the first sheet, with their emitting faces 31 turned toward the internal edge 14. The LED modules are supported by a removable opaque cover 9, fixed by means of clips 16 to the first main surface 11 of the first sheet. The light extraction means 7 is located in the immediate proximity of the internal edge 14. In this case, this means is an opaque light-colored enamel coating located on the second main face 12 of the first sheet. An opaque masking enamel coating 8 on the first main face 21 of the second sheet 2 is provided to prevent the direct emission of light from the LEDs 3 toward the outside of the vehicle.

The through hole 4, the LED module 3, the opaque cover 9 and the light extraction means 7 have circular central symmetry, although this is not apparent in this drawing.

FIG. 2 shows an embodiment in which the second sheet 2 has no through hole. In this case, an opaque black enamel coating 8 on the first main face 21 of the second sheet 2 provides masking toward the outside. On this enamel coating 8 there is fixed an LED module having a plurality of LEDs 3 arranged so that their emitting faces 31 are turned toward the internal edge 14 of the through hole 4 pierced in the first sheet 1. These lateral emission LEDs send the light into the first sheet 1 from which it is extracted by the extraction means 7 which in this case is a semitransparent light-colored enamel coating located on the first main face 11 of the first sheet. In addition to the lateral emission LEDs 3 for the indirect lighting, a front emission LED 15 is placed at the center of the hole, with its emitting face 18 oriented toward the inside of the vehicle. The light emitted by this LED 15 is diffused by the diffusing translucent cover 9 fixed reversibly to the first main face of the first sheet 11 by means of clips 16.

FIG. 3, like FIG. 2, shows an embodiment combining direct and indirect lighting, these two types of lighting being emitted in this case toward the outside of the vehicle. The through hole 4 has been pierced through the first sheet and the lamination interlayer 5 only, while the second sheet is not pierced. The opaque cover 9, fixed to the first main face 11 of the first sheet by a bead of adhesive 16, carries a circular LED module with lateral emission LEDs 3, with their emitting faces 31 turned toward the internal edge 14 of the hole 4. The light injected by these LEDs 3 into the first sheet 1 is immediately extracted and diffused toward the outside by an opaque enamel coating 7 on the first main face 11 of the first sheet.

Front emission LEDs 15 are placed, with their emitting faces 18 turned toward the second sheet 2, in the center of the LED module 3. The light emitted by these LEDs 15 is diffused, by a semi-opaque diffusing enamel coating 19 on the first main face of the second sheet, toward the outside of the vehicle.

The invention claimed is:

1. An illuminating glazing unit for vehicles, comprising:
a first transparent sheet of mineral glass with a first main face, a second main face, and a peripheral edge;
a second transparent sheet of mineral glass with a first main face, a second main face and a peripheral edge;
a transparent lamination interlayer which is in adhesive contact with the second main face of the first sheet and the first main face of the second sheet;
a plurality of light-emitting diodes, each having an emitting face, and
a light extraction element,
wherein the first sheet is pierced with a through hole delimited by an internal edge,
wherein one or more of the plurality of light-emitting diodes are housed in the through hole, with their emitting faces turned toward the internal edge,
wherein the light extraction element is configured to extract light emitted by the plurality of light-emitting diodes, via the internal edge of the through-hole, into the first transparent sheet of mineral glass, and
wherein the through hole extends through the lamination interlayer and the second transparent sheet.

2. The illuminating glazing unit as claimed in claim 1, wherein the through hole in the second sheet is filled with a blocking element.

3. The illuminating glazing unit as claimed in claim 1, wherein the light extraction element is located in the immediate proximity of the through hole, the distance separating the internal edge from the light extraction element is not more than 20 cm.

4. The illuminating glazing unit as claimed in claim 1, wherein the light extraction element is an opaque diffusing coating located on the second main face of the first sheet.

5. The illuminating glazing unit as claimed in claim 1, wherein the light extraction element takes the form of one or more areas arranged around the through hole.

6. The illuminating glazing unit as claimed in claim 1, wherein the through hole in which the one or more of the plurality of light-emitting diodes are housed is closed by a cover.

7. The illuminating glazing unit as claimed in claim 6, wherein the cover is an opaque cover.

8. The illuminating glazing unit as claimed in claim 6, wherein the cover is made of a translucent or transparent material, and wherein the glazing unit additionally contains light-emitting diodes whose emitting faces are turned toward the cover instead of toward the internal edge.

9. The illuminating glazing unit as claimed in claim 8, wherein the cover is a removable cover, fixed onto the first main face of the first sheet by reversible fixing means.

10. A vehicle having an illuminating glazing unit as claimed in claim 1, wherein the first main face of the first sheet of the glazing unit is in contact with the inside of the vehicle.

11. The vehicle as claimed in claim 10, wherein the vehicle is a motor vehicle.

12. The vehicle as claimed in claim 11, wherein the illuminating glazing unit is part of a roof of the vehicle.

13. The illuminating glazing unit as claimed in claim 1, wherein the light extraction element is located on one of the first and second main faces of the first sheet.

14. The illuminating glazing unit as claimed in claim 2, wherein the blocking element is an opaque polymer material.

15. The illuminating glazing unit as claimed in claim 3, wherein the distance is not more than 5 cm.

16. The illuminating glazing unit as claimed in claim 4, wherein the opaque diffusing coating is white in color.

* * * * *